(12) United States Patent
Walker et al.

(10) Patent No.: US 11,502,876 B2
(45) Date of Patent: Nov. 15, 2022

(54) TRANSCEIVER DEVICE FOR A BUS SYSTEM AND OPERATING METHOD THEREFOR

(71) Applicant: Robert Bosch GmbH, Stuttgart (DE)

(72) Inventors: Steffen Walker, Reutlingen (DE); Arthur Mutter, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 16/976,856

(22) PCT Filed: Mar. 5, 2019

(86) PCT No.: PCT/EP2019/055365
§ 371 (c)(1),
(2) Date: Aug. 31, 2020

(87) PCT Pub. No.: WO2019/174960
PCT Pub. Date: Sep. 19, 2019

(65) Prior Publication Data
US 2020/0412583 A1     Dec. 31, 2020

(30) Foreign Application Priority Data
Mar. 12, 2018   (DE) .......................... 102018203708.6

(51) Int. Cl.
*H04L 25/02* (2006.01)
*H04L 12/413* (2006.01)
(52) U.S. Cl.
CPC ...... *H04L 25/0272* (2013.01); *H04L 12/4135* (2013.01)

(58) Field of Classification Search
CPC ............. H04L 12/4135; H04L 25/0272; H04L 2012/40215; H04L 25/061; H04L 25/029;
(Continued)

(56) References Cited

U.S. PATENT DOCUMENTS 5,892,893 A    4/1999  Hanf et al.
6,484,223 B1 * 11/2002  Lenz ................. H04L 25/03834
                                                        361/111

(Continued)

FOREIGN PATENT DOCUMENTS

CN      101540627 A    9/2009
CN      102210100 A    10/2011
(Continued)

OTHER PUBLICATIONS

International Search Report for PCT/EP2019/055365, dated Jul. 16, 2019.

*Primary Examiner* — Man U Phan
(74) *Attorney, Agent, or Firm* — Norton Rose Fulbright US LLP; Gerard Messina (57) ABSTRACT

A transceiver device for a bus system. The transceiver device includes a first bus terminal for connection to a first signal line of the bus system, a second bus terminal for connection to a second signal line of the bus system, and a receiving unit for receiving a bus receive signal from the first and second bus terminals. The transceiver device is designed to interconnect the first and second bus terminals via a predefinable electrical resistance for a predefinable first period of time. The predefinable first period of time is selectable as a function of at least one parameter of the receiving unit.

19 Claims, 4 Drawing Sheets

(58) Field of Classification Search
CPC ... H04L 25/069; H04L 25/0286; H04L 25/02; H04L 12/413; H04L 12/40; H04L 9/32; H04B 1/16
USPC .......................................................... 370/447
See application file for complete search history.

(56) References Cited

U.S. PATENT DOCUMENTS

| | | | | |
|---|---|---|---|---|
| 6,529,037 | B1* | 3/2003 | Haycock | H04L 25/0276 |
| | | | | 326/26 |
| 8,041,865 | B2* | 10/2011 | Bruennert | G06F 13/4086 |
| | | | | 710/104 |
| 8,598,918 | B2* | 12/2013 | Suzuki | H03K 17/0822 |
| | | | | 327/108 |
| 9,606,948 | B2* | 3/2017 | Monroe | G06F 13/372 |
| 10,063,391 | B2* | 8/2018 | Walker | H04L 12/4135 |
| 10,425,361 | B2* | 9/2019 | Daugherty, III | H04L 49/205 |
| 10,454,705 | B2* | 10/2019 | Hartwich | H04L 25/0278 |
| 10,693,435 | B2* | 6/2020 | Shapiro | H03H 7/20 |
| 10,776,307 | B2* | 9/2020 | Mutter | G06F 13/4282 |
| 10,922,264 | B1* | 2/2021 | Adamson | H04L 12/40013 |
| 10,964,996 | B2* | 3/2021 | Kim | H01P 5/04 |
| 11,061,844 | B2* | 7/2021 | de Haas | G06F 13/4027 |
| 11,068,429 | B2* | 7/2021 | Brando | H04L 12/40013 |
| 11,133,957 | B2* | 9/2021 | Portillo | H04L 12/40 |
| 11,146,419 | B2* | 10/2021 | Walker | H04L 12/40013 |
| 11,206,154 | B2* | 12/2021 | Sonnek | H04L 12/40032 |
| 2011/0158258 | A1 | 6/2011 | Suzuki et al. | |
| 2011/0285424 | A1 | 11/2011 | Suzuki et al. | |
| 2017/0180152 | A1* | 6/2017 | Cink | H04L 12/40013 |
| 2017/0262394 | A1 | 9/2017 | De Haas et al. | |
| 2020/0412573 | A1* | 12/2020 | Stegemann | H04L 12/40123 |
| 2021/0001788 | A1* | 1/2021 | de Haas | H04L 12/40 |
| 2021/0014083 | A1* | 1/2021 | Mutter | H04L 25/0272 |
| 2021/0120017 | A1* | 4/2021 | Antonsson | G06F 21/604 |
| 2021/0175887 | A1* | 6/2021 | Hiemstra | G11C 7/1057 |

FOREIGN PATENT DOCUMENTS

| | | |
|---|---|---|
| DE | 102015222334 A1 | 5/2017 |
| JP | 2011135283 A | 7/2011 |
| JP | 2017076054 A | 4/2017 |
| JP | 2018182431 A | 11/2018 |

* cited by examiner

TRANSCEIVER DEVICE FOR A BUS SYSTEM AND OPERATING METHOD THEREFOR

FIELD

The present invention relates to a transceiver device for a bus system, the transceiver device including a first bus terminal for connection to a first signal line of the bus system, a second bus terminal for connection to a second signal line of the bus system and a receiving unit for receiving a bus receive signal from the first and second bus terminals.

The present invention further relates to a method for operating such a transceiver device.

BACKGROUND INFORMATION

A device and a method are described in German Patent Application No. DE 102015222334 A1 for selectively masking bus oscillations when receiving data via a bus system. The conventional device provides a masking element for masking oscillations of the bus signal. The masking element is comparatively complex.

SUMMARY

It is an object of the present invention to improve a transceiver device of the aforementioned type and an operating method therefor to the extent that the aforementioned disadvantages of the related art are reduced or avoided.

In accordance with an example embodiment of the present invention, a transceiver device for a bus system is provided, the transceiver device being designed to interconnect the first and second bus terminals via a predefinable electrical resistance for a predefinable first period of time, the predefinable first period of time being selectable as a function of at least one parameter of the receiving unit. This advantageously enables a reduction of undesirable bus oscillations without the requirement of a comparatively complex masking unit as it is in the related art. With the connection of the bus terminals with the aid of the predefinable electrical resistance for the predefinable first period of time, it is possible to advantageously reduce potentially occurring bus oscillations, because in the first period of time a greater attenuation results due to the connected resistance so that the resistance is activatable for an optimally long or short period of time until a sufficient attenuation of undesirable bus oscillations takes place, but not longer.

In preferred specific embodiments of the present invention, the receiving unit includes a receiving comparator, which is designed to form a bus differential signal as a function of the bus receive signal, the at least one parameter of the receiving unit being the bus differential signal or a signal derived therefrom. Thus, the predefinable first period of time is ascertainable particularly precisely.

In further specific embodiments of the present invention, the receiving comparator includes multiple reception thresholds, in particular for the bus differential signal, as a result of which it may be particularly efficiently ascertained for how long the resistor is to be connected to the bus lines (predefinable first period of time).

In further specific embodiments of the present invention, a first reception threshold is approximately 0.7 volts, a second reception threshold, in particular, being at a value of less than approximately 0 volts, and a third reception threshold, in particular, being between approximately 0 volts and the first reception threshold. According to studies by the applicant, the first period of time is particularly easily and precisely ascertainable as a result.

In further specific embodiments of the present invention, the transceiver device is designed to interconnect the first and second bus terminal via the predefinable electrical resistance for a predefinable first period of time, if at least one of the existing conditions is present: a) a rising edge of the transmission input signal for a transmitting unit of the transceiver device, b) a state transition of the transmitting unit from an operating state in which the first and second bus terminals are driven into an operating state in which the first and second bus terminals are non-driven, c) a falling edge of a differential signal derived from the bus receive signal with the aid of the receiving unit.

In further specific embodiments of the present invention, the predefinable electrical resistance has a value of between approximately 40 ohms and approximately 200 ohms, preferably between approximately 80 ohms and approximately 160 ohms, further preferably between 100 ohms and approximately 140 ohms, in particular preferably approximately 120 ohms.

Further aspects of the specific embodiments of the present invention include a user station for a bus system including at least one transceiver device as described herein.

Further aspects of the specific embodiments of the present invention include a bus system including a bus line, which includes at least one first signal line and at least one second signal line, and including at least two user stations, at least one of the at least two user stations including at least one transceiver device as described herein.

Further aspects of the specific embodiments of the present invention are specified by a method for operating a transceiver device for a bus system as described herein. Advantageous refinements of the present invention are described herein.

Further features, potential applications and advantages of the present invention result from the following description of exemplary embodiments of the present invention, which are depicted in the figures. All described or depicted features in and of themselves or in arbitrary combination form the subject matter of the present invention, regardless of their wording or representation in the description herein or in the figures.

DETAILED DESCRIPTION OF EXAMPLE EMBODIMENTS

DETAILED DESCRIPTION OF EXAMPLE EMBODIMENTS

Figure 1:
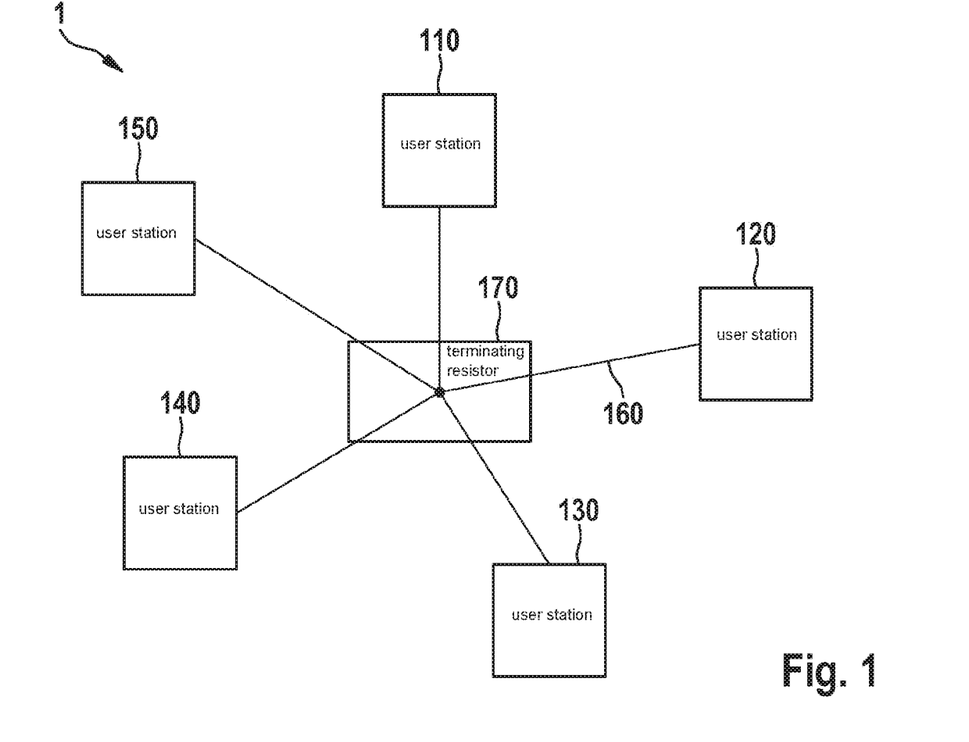
FIG. 1 schematically shows a simplified block diagram of a bus system according to one specific embodiment of the present invention.

FIG. 1 schematically shows a simplified block diagram of a bus system 1 according to one specific embodiment of the present invention, which may be used in a vehicle, in particular, in a motor vehicle, an aircraft, etc. or in an industrial robot, etc. Bus system 1 in FIG. 1 has a first user station 110, a second user station 120, a third user station 130, a fourth user station 140, a fifth user station 150, a bus line 160 and a terminating resistor 170, the user stations 110 through 150 being situated in a star-shaped topology. Bus system 1 may, for example, be a CAN bus system or a CAN FD bus system, etc. Bus system 1 in the present exemplary embodiment is designed, in general, for a communication in which an exclusive, collision-free access of one of user stations 110 through 150 to bus line 160 is at least temporarily ensured. First user station 110 may, for example, be a control unit of a motor vehicle. Second, fourth and fifth user station 120, 140, 150 may, for example, each be a sensor of the motor vehicle. Third user station 130 may, for example, be a display device of a motor vehicle.

Figure 2:
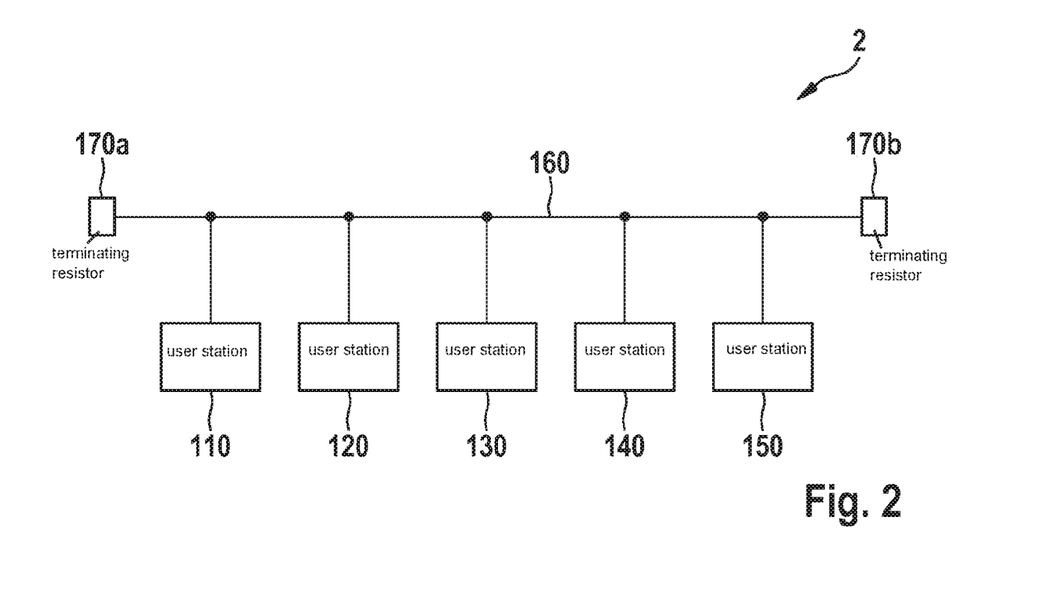
FIG. 2 schematically shows a simplified block diagram of a bus system according to one further specific embodiment of the present invention.

FIG. 2 shows a bus system 2 according to one further exemplary embodiment of the present invention. In contrast to bus system 1 according to the first exemplary embodiment of the present invention, however, bus system 2 according to the second exemplary embodiment has a linear bus topology including two terminating resistors 170a, 170b at each end of bus line 160. User stations 110 through 150 in bus system 2 according to FIG. 2 may be structured in the same way as in FIG. 1.

Figure 3:
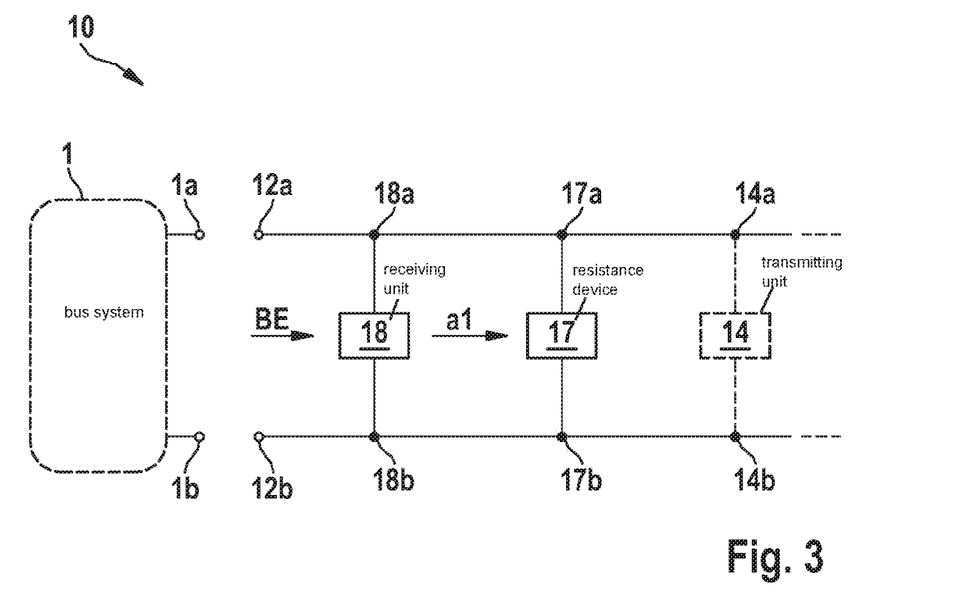
FIG. 3 schematically shows a block diagram of a transceiver device according to one specific embodiment of the present invention.

FIG. 3 schematically shows a block diagram of a transceiver device 10 for a bus system according to one specific embodiment. For example, transceiver device 10 described below with reference to FIG. 3 may be used in at least one user station 110, . . . , 150 of bus systems 1, 2 described above with reference to FIGS. 1, 2.

Transceiver device 10 includes a first bus terminal 12a for connection to a first signal line 1a of bus system 1 schematically indicated in FIG. 3, and a second bus terminal 12b for connection to a second signal line 1b of bus system 1. For example, bus line 160 (FIG. 1) therefore includes the two signal lines 1a, 1b.

Transceiver device 10 further includes a receiving unit 18 for receiving a bus receive signal BE from the first and second bus terminals 12a, 12b. For this purpose, receiving unit 18 is connected to bus terminals 12a, 12b via its terminals 18a, 18b.

According to an example embodiment of the present invention, transceiver device 10 is designed to interconnect first and second bus terminals 12a, 12b via a predefinable electrical resistance for a predefinable first period of time.

Figure 4:
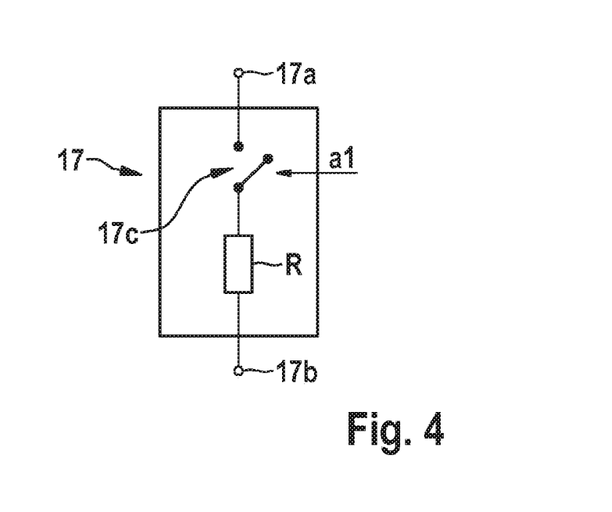
FIG. 4 schematically shows a block diagram of a resistance device according to one specific embodiment of the present invention.

This may take place, for example, via the resistance device 17 shown by way of example in FIG. 3, which is connected via its terminals 17a, 17b to bus terminals 12a, 12b, and which has the structure depicted, for example, in FIG. 4.

Resistance device 17 may exhibit an electrical resistance R having a value of between approximately 40 ohms and approximately 200 ohms, preferably between approximately 80 ohms and approximately 160 ohms, further preferably between 100 ohms and approximately 140 ohms, in particular preferably with approximately 120 ohms, as well as a switch 17c situated in series for this purpose which is controllable by a control signal a1, in the present case, for example, provided by receiving unit 18 (FIG. 3). In other specific embodiments, resistance device 17 may, for example, also include a semiconductor component, in particular, a field effect transistor or the like, the drain-source path of which is controllable by the action of control signal a1, for example, between a high-impedance state ("no attenuation resistance connected") and an operating state including a resistance of the drain-source path in the aforementioned range, for example, of approximately 120 ohms.

According to an example embodiment of the present invention, it is further provided that the predefinable first period of time for which resistance R is activatable with respect to bus terminals 12a, 12b is selectable as a function of at least one parameter of receiving unit 18. This ensures that resistance R is activatable as long as it is useful for the operation of receiving unit 18 or of device 10 but, for example, not longer. For example, receiving unit 18 accordingly specifies the first predefinable period of time for which resistance R is activated with respect to bus terminals 12a, 12b, which takes place, for example, via control signal 1a.

Transceiver device 10 may optionally also have a transmitting unit 14 for outputting a bus transmit signal to the first and second bus terminals 12a, 12b, for example, for transmitting pieces of information via bus line 160 to other user stations or to their respective transceiver devices (not shown). Transmitting unit 14 is preferably connected to bus terminals 12a, 12b via its terminals 14a, 14b.

Figure 5:
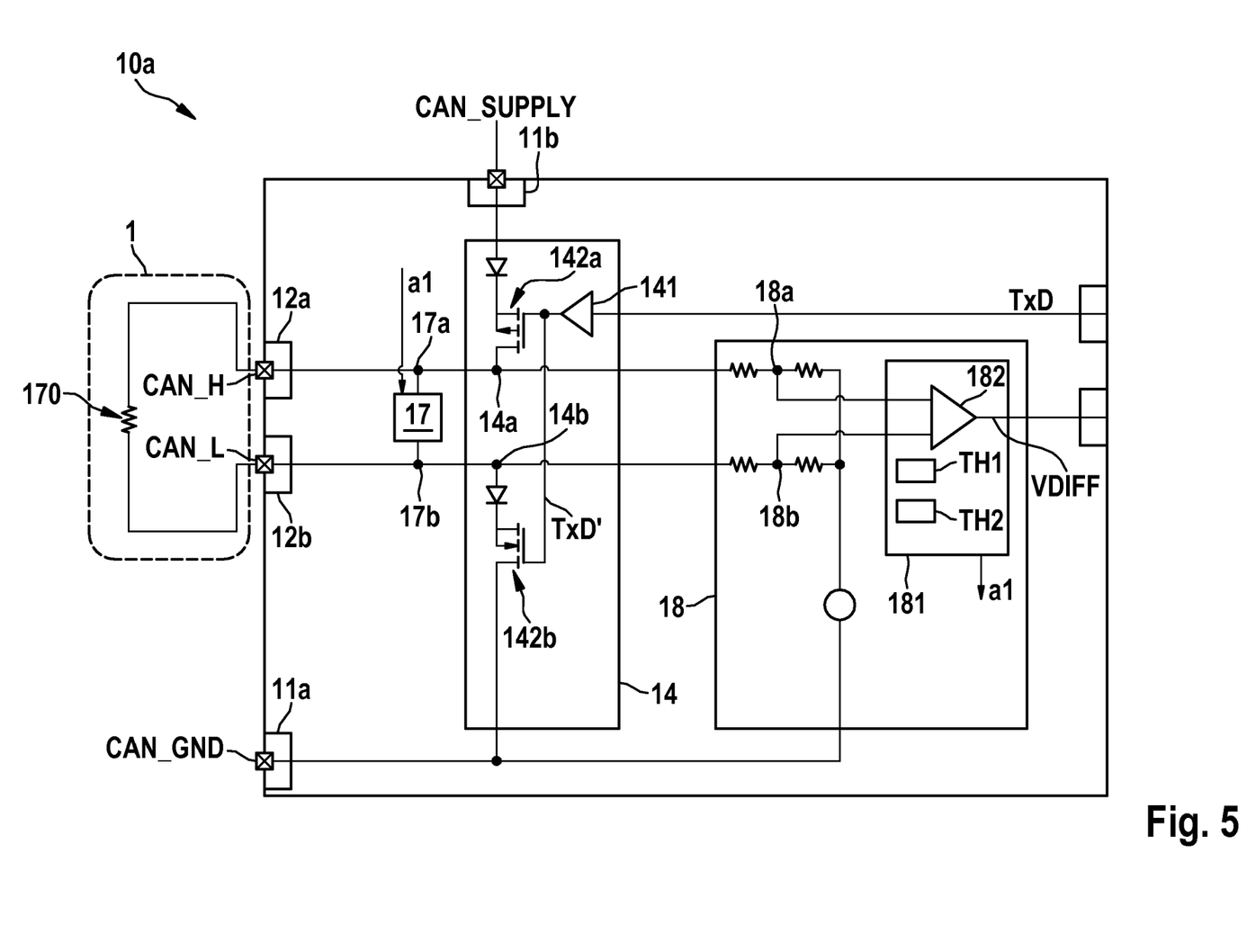
FIG. 5 schematically shows a block diagram of a transceiver device according to one further specific embodiment of the present invention.

FIG. 5 schematically shows a block diagram of a transceiver 10a according to one further specific embodiment of the present invention which, in the present case, is designed, for example, for the operation at a bus system 1 designed as a CAN FD bus system. Essentially only the differences compared to configuration 10 according to FIG. 3 are described below. Transceiver device 10a is connected via a terminal 11a to a first reference potential CAN_GND, which is a ground potential, for example. Transceiver 10a is connected via a terminal 11b to a second reference potential CAN_SUPPLY, which is a reference potential of, for example, +5 volts, corresponding to an operating voltage, for example.

Transmission unit 14 includes a transmission signal driver 141, which generates an output signal for activating the two semiconductor switches 142a, 142b as a function of transmission input signal TxD fed to it. As is apparent from FIG. 5, first terminal 14a of transmitting unit 14, via which transmitting unit 14 is connected to first bus terminal 12a, may be set at an electrical potential as a function of second reference potential CAN_SUPPLY upon corresponding activation of first semiconductor switch 142a by transmission input signal TxD (or amplified transmission input signal TxD'). Similarly, second terminal 14b of transmitting unit 14, via which transmitting unit 14 is connected to second bus terminal 12b, may be set at an electrical potential as a function of first reference potential CAN_GND upon corresponding activation of first semiconductor switch 142b by transmission input signal TxD. This operating state of transmitting unit 14 is therefore also referred to as a driven operating state of transmitting unit 14. A non-driven operating state of transmitting unit 14 accordingly results when relevant terminals 14a, 14b, or 12a, 12b are not set at the aforementioned potentials by semiconductor switches 142a, 142b. This state may also be referred to as a high-impedance state of transmitting unit 14. Undesirable bus oscillations may occur, for example, if transmitting unit 14 switches from the driven operating date into the non-driven operating state. The bus oscillations may then be advantageously also attenuated with the aid of resistance device 17 using the principle described above.

Figure 6:
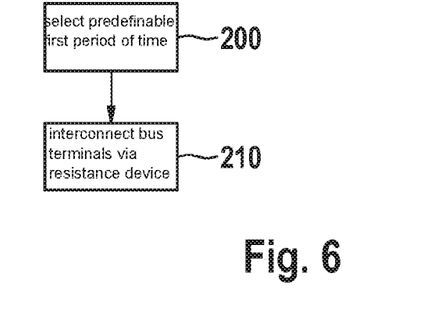
FIG. 6 shows a simplified flow chart of a method according to one specific embodiment of the present invention.

Accordingly, the method according to the specific embodiments of the present invention may be carried out, for example, in the configuration described by way of example in FIG. 5 as well, cf. resistance device 17 and control signal a1. For this purpose, FIG. 6 shows a simplified flow chart of a method according to one specific embodiment. In step 200, transceiver device 10a (FIG. 5) selects the predefinable first period of time as a function of at least one parameter of receiving unit 18, and in step 210, transceiver device 10a interconnects bus terminals 12a, 12b via resistance R (FIG. 4) of resistance device 17 for this previously selected first period of time.

An at least partially temporarily overlapping implementation of steps 200, 210 is also possible in further specific embodiments of the present invention. For example, a starting point in time for the activation of resistance device 17 may be initially selected, and this device is activated accordingly, and thereafter, as a function of the at least one parameter of receiving unit 18, for example, the predefinable period of time for the activation of resistance device 17 may be ascertained, and the activation may be terminated after its expiry.

In further specific embodiments of the present invention, receiving unit 18 (FIG. 5) includes a receiving comparator 181, which is designed to form a bus differential signal VDIFF as a function of the bus receive signal, the at least one parameter of receiving unit 18 being the bus differential signal VDIFF or a signal derived therefrom. In this way, it is possible to particularly precisely ascertain the predefinable first period of time. For example, bus differential signal VDIFF may be formed from bus signals CAN_H, CAN_L with the aid of a differential amplifier 182. Bus differential signal VDIFF may also be considered to be an analogous differential voltage between the CAN bus lines CAN_H and CAN_L. In this case, VDIFF=CAN_H−CAN_L is applicable. Differential voltage VDIFF is, for example, 0 volts for a recessive bit and typically 2 volts for a dominant bit.

In further specific embodiments of the present invention, receiving comparator 181 includes multiple reception thresholds TH1, TH2, . . . , in particular, for bus differential signal VDIFF, as a result of which it may be particularly efficiently ascertained for what duration resistance R (FIG. 4) is to be connected to bus lines 12a, 12b. The control takes place again with the aid of control signal a1, which is formable in the configuration of FIG. 5 by receiving comparator 181 and is outputtable to resistance device 17.

In further specific embodiments of the present invention, a first reception threshold TH1 is at approximately 0.7 volts, a second reception threshold TH2, in particular, being at a value of less than approximately 0 volts, and a third reception threshold TH3, in particular, being between approximately 0 volts and the first reception threshold. According to studies by the applicant, the first period of time is particularly easily and precisely ascertainable as a result.

Figure 7:
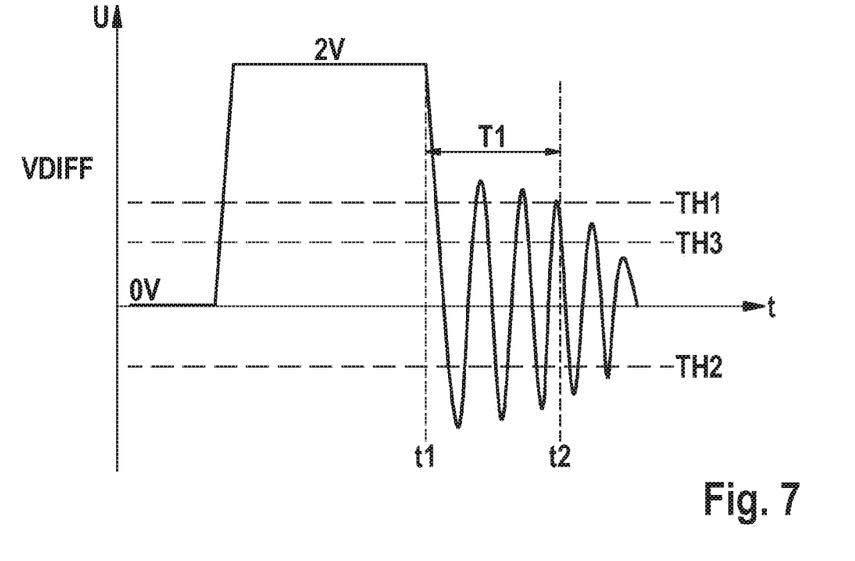
FIG. 7 schematically shows a temporal profile of a parameter according to one specific embodiment of the present invention.

For this purpose, FIG. 7 schematically shows a temporal profile of bus differential signal VDIFF according to one specific embodiment. At a point in time t1, i.e., in the present case in the falling edge of bus differential signal VDIFF, undesirable oscillations start, which may be attenuated by switching on resistance R (FIG. 4) for predefinable first period of time T1, i.e., up to point in time t2.

In further specific embodiments of the present invention, transceiver device 10a (FIG. 5) is designed to interconnect the first and second bus terminals 12a, 12b via predefinable electrical resistance R for a predefinable first period of time, if at least one of the existing conditions is present: a) a rising edge of a transmission input signal TxD for transmitting unit 14 of transceiver device 10a, b) a state transition of transmitting unit 14 from an operating state in which the first and second bus terminals are driven into an operating state in which the first and second bus terminals are non-driven, c) a falling edge of a differential signal VDIFF derived from bus receive signal BE with the aid of receiving unit 18 (FIG. 7). Thus, starting point in time t1 for the activation of resistance R is, for example, selectable as a function of at least one of these criteria.

In contrast, predefinable first period of time T1 is advantageously selectable as a function of the at least one parameter of receiving unit 18 (FIG. 5), in the present case for example, as a function of time curve VDIFF, for example, with respect to the undershooting or exceedance of at least one of the aforementioned reception thresholds TH1, TH2, TH3.

In some specific embodiments of the present invention, it may be provided that differential signal VDIFF (FIG. 7) may be monitored for the undershooting of negative reception threshold TH2, and subsequently whether first reception threshold TH1 is exceeded or not exceeded after a detected (single or multiple) undershooting of negative reception threshold TH2 within a predefinable waiting time, which is preferably shorter than a bit time of the data transmission on the bus system (in particular, significantly shorter, for example, less than approximately 20 percent of the bit time of the data transmission on the bus system). If, for example, negative reception threshold TH2 has been undershot by differential signal VDIFF, and further if within the predefinable waiting time after this undershooting of negative reception threshold TH2, first reception threshold TH1 is not exceeded by differential signal VDIFF, it may be deduced that an undesirable oscillation per se of differential signal VDIFF was present (due to the undershooting of negative reception threshold TH2), but that in the meantime (within the waiting time) this undesirable oscillation decayed to a sufficiently high degree (due to first reception threshold TH1 not having been exceeded during the waiting time). This state is achieved in FIG. 7 approximately at point in time t2. In the present example, negative reception threshold TH2 is undershot a total of three times between points in time t1 and t2, and first reception threshold TH1 is exceeded after the respective first and second undershooting of negative reception threshold TH2, after the third undershooting of negative reception threshold TH2; however, first reception threshold TH1 is subsequently at best barely reached, but no longer exceeded, cf. point in time t2. Thus, in some specific embodiments, the connection of resistance R (FIG. 4) may be deactivated starting at point in time t2. In further specific embodiments, it may be also provided to deactivate resistance R starting at point in time t2 plus a predefinable protection time of, for example, approximately 5 nanoseconds to approximately 10 nanoseconds, the undesirable oscillation then having particularly reliably decayed to a tolerable degree.

In other words, transceiver device 10, 10a in some specific embodiments of the present invention may be designed to monitor differential signal VDIFF for the undershooting of negative reception threshold TH2, and subsequently, whether first reception threshold TH1 is not exceeded after a detected (in particular, single or multiple) undershooting of negative reception threshold TH2 within a predefinable waiting time, which is preferably shorter (in particular, significantly shorter) than a bit time of the data transmission on the bus system. The point in time at which these conditions are met may be used as the end of predefinable first period of time T1, i.e., as a signal for deactivating resistance R.

In preferred specific embodiments of the present invention, predefinable first period of time T1 (FIG. 7) for activating resistance R (FIG. 4) is typically selectable between approximately 40 ns (nanoseconds) and approximately 150 ns. In other specific embodiments, other values are also possible.

The features according to the specific embodiments of the present invention is not limited to the application in CAN bus systems or CAN FD bus systems, but is usable, for example, also in LVDS bus systems or LIN bus systems, or in general in all bus systems having dominant and recessive bus states.

What is claimed is:

1. A transceiver device for a bus system, comprising:
    a first bus terminal for connection to a first signal line of the bus system;
    a second bus terminal for connection to a second signal line of the bus system;
    a receiving unit configured to receive a bus receive signal from the first bus terminal and the second bus terminal; and
    circuitry that is configured to switchably interconnect, or maintain an interconnection of, the first bus terminal and the second bus terminal to each other via an electrical resistance in response to at least one of:
        a) presence on the circuitry of a rising edge of a transmission input signal that, when placed on the circuitry, causes a corresponding transmission by the transceiver device;
        b) a state transition from an operating state in which the first bus terminal and the second bus terminal are driven by presence of the transmission input signal on the transceiver device, into an operating state in which the first bus terminal and the second bus terminal are non-driven due to cessation of the transmission input signal on the transceiver device;
        c) presence on the circuitry of a falling edge of a differential signal derived by the receiving unit from the bus receive signal; and
        d) a determination that the differential signal exceeds a first predefined threshold and undershoots a second predefined threshold, which is lower than the first predefined threshold, within a predefined amount of time of each other.

2. The transceiver device as recited in claim 1, wherein the circuitry is configured to switchably interconnect the first bus terminal and the second bus terminal to each other via the electrical resistance for a period of time in response to at least one of:
    a) the presence on the circuitry of the rising edge of the transmission input signal that, when placed on the circuitry, causes the corresponding transmission by the transceiver device;
    b) the state transition from the operating state in which the first bus terminal and the second bus terminal are driven by the presence of the transmission input signal on the transceiver device, into the operating state in which the first bus terminal and the second bus terminal are non-driven due to the cessation of the transmission input signal on the transceiver device; and
    c) the presence on the circuitry of the falling edge of the differential signal derived by the receiving unit from the bus receive signal.

3. The transceiver device as recited in claim 1, wherein the electrical resistance has a predefined value of between 40 ohms and 200 ohms.

4. The transceiver device as recited in claim 1, wherein the electrical resistance has a predefined value of between 80 ohms and 160 ohms.

5. The transceiver device as recited in claim 1, wherein the electrical resistance has a predefined value of between 100 ohms and 140 ohms.

6. The transceiver device as recited in claim 1, wherein the electrical resistance has a predefined value of 120 ohms.

7. The transceiver device as recited in claim 2, wherein the transceiver device includes a transmission unit for effecting the transmission, the transmission unit including:
    a first switch connected to a first reference voltage and to the first signal line of the bus system;
    a second switch connected to a second reference voltage and to the second signal line of the bus system; and
    a signal driver that:
        is arranged so that the transmission input signal, when the transmission signal is present on the circuitry, is applied to the signal driver; and
        responds to the application of the signal driver to the signal driver by closing the first and second switches, thereby causing the first reference voltage to be applied via the first switch to the first signal line of the bus system and the second reference voltage to be applied via the second switch to the second signal line of the bus system.

8. The transceiver device as recited in claim 7, wherein:
    the operating state in which the first bus terminal and the second bus terminal are driven is when the first reference voltage is applied via the first switch to the first signal line of the bus system and the second reference voltage is applied via the second switch to the second signal line of the bus system; and
    the operating state in which the first bus terminal and the second bus terminal are non-driven is when the first and second switches are open.

9. The transceiver device as recited in claim 1, wherein the circuitry is configured to switchably interconnect, or maintain the interconnection of, the first bus terminal and the second bus terminal to each other via the electrical resistance in response to the determination that the differential signal exceeds the first predefined threshold and undershoots the second predefined threshold within the predefined amount of time of each other.

10. The transceiver device as recited in claim 9, wherein the receiving unit includes a receiving comparator which is configured to form the differential signal as a function of the bus receive signal.

11. The transceiver device as recited in claim 10, wherein the first threshold is at approximately 0.7 volts and the second threshold is at a value of less than approximately 0 volts.

12. The transceiver device as recited in claim 9, wherein, in a state in which the first and second bus terminals are interconnected via the electrical resistance, the circuitry is configured to switch off the interconnection via the electrical resistance between the first and second bus terminals in response to a determination that the first threshold has not been exceeded within the predetermined amount of time after the second threshold has been determined to have been undershot.

13. The transceiver device as recited in claim 9, wherein the predefined amount of time is less than an amount of time the transceiver device takes to transmit a bit of data.

14. The transceiver device as recited in claim 9, wherein the predefined amount of time is less than twenty percent of an amount of time the transceiver device takes to transmit a bit of data.

15. The transceiver device as recited in claim 9, wherein the differential signal is a difference between a value of a signal at the first bus terminal and a value of a signal at the second bus terminal.

16. A user station for a bus system, comprising:
at least one transceiver device including:
   a first bus terminal for connection to a first signal line of the bus system;
   a second bus terminal for connection to a second signal line of the bus system;
   a receiving unit configured to receive a bus receive signal from the first bus terminal and the second bus terminal; and
   circuitry that is configured to switchably interconnect, or maintain an interconnection of, the first bus terminal and the second bus terminal to each other via an electrical resistance in response to at least one of:
      a) presence on the circuitry of a rising edge of a transmission input signal that, when placed on the circuitry, causes a corresponding transmission by the transceiver device;
      b) a state transition from an operating state in which the first bus terminal and the second bus terminal are driven by presence of the transmission input signal on the transceiver device, into an operating state in which the first bus terminal and the second bus terminal are non-driven due to cessation of the transmission input signal on the transceiver device;
      c) presence on the circuitry of a falling edge of a differential signal derived by the receiving unit from the bus receive signal; and
      d) a determination that the differential signal exceeds a first predefined threshold and undershoots a second predefined threshold, which is lower than the first predefined threshold, within a predefined amount of time of each other.

17. A bus system, comprising:
a bus line which includes a first signal line and a second signal line; and
at least two user stations, at least one of the at least two user stations including a transceiver device, the transceiver device including:
   a first bus terminal for connection to the first signal line;
   a second bus terminal for connection to the second signal line;
   a receiving unit configured to receive a bus receive signal from the first bus terminal and the second bus terminal; and
   circuitry that is configured to switchably interconnect, or maintain an interconnection of, the first bus terminal and the second bus terminal to each other via an electrical resistance in response to at least one of:
      a) presence on the circuitry of a rising edge of a transmission input signal that, when placed on the circuitry, causes a corresponding transmission by the transceiver device;
      b) a state transition from an operating state in which the first bus terminal and the second bus terminal are driven by presence of the transmission input signal on the transceiver device, into an operating state in which the first bus terminal and the second bus terminal are non-driven due to cessation of the transmission input signal on the transceiver device;
      c) presence on the circuitry of a falling edge of a differential signal derived by the receiving unit from the bus receive signal; and
      d) a determination that the differential signal exceeds a first predefined threshold and undershoots a second predefined threshold, which is lower than the first predefined threshold, within a predefined amount of time of each other.

18. A method for operating a transceiver device for a bus system, the transceiver device including a first bus terminal for connection to a first signal line of the bus system, a second bus terminal for connection to a second signal line of the bus system, a receiving unit configured to receive a bus receive signal from the first bus terminal and the second bus terminal, and circuitry, the method comprising:
operating the circuitry to interconnect, or maintain an interconnection of, the first bus terminal and the second bus terminal to each other via an electrical resistance in response to at least one of:
   a) presence on the circuitry of a rising edge of a transmission input signal that, when placed on the circuitry, causes a corresponding transmission by the transceiver device;
   b) a state transition from an operating state in which the first bus terminal and the second bus terminal are driven by presence of the transmission input signal on the transceiver device, into an operating state in which the first bus terminal and the second bus terminal are non-driven due to cessation of the transmission input signal on the transceiver device;
   c) presence on the circuitry of a falling edge of a differential signal derived by the receiving unit from the bus receive signal; and
   d) a determination that the differential signal exceeds a first predefined threshold and undershoots a second predefined threshold, which is lower than the first predefined threshold, within a predefined amount of time of each other.

19. The method as recited in claim 18, wherein the circuitry is configured to switchably interconnect the first bus terminal and the second bus terminal to each other via the electrical resistance for a period of time in response to at least one of:
   a) the presence on the circuitry of the rising edge of the transmission input signal that, when placed on the circuitry, causes the corresponding transmission by the transceiver device;
   b) the state transition from the operating state in which the first bus terminal and the second bus terminal are driven by the presence of the transmission input signal on the transceiver device, into the operating state in which the first bus terminal and the second bus terminal are non-driven due to the cessation of the transmission input signal on the transceiver device; and
   c) the presence on the circuitry of the falling edge of the differential signal derived by the receiving unit from the bus receive signal.

* * * * *